(12) United States Patent
Wild

(10) Patent No.: US 11,132,119 B2
(45) Date of Patent: Sep. 28, 2021

(54) USER INTERFACE AND METHOD FOR ADAPTING A VIEW OF A DISPLAY UNIT

(71) Applicant: VOLKSWAGEN AKTIENGESELLSCHAFT, Wolfsburg (DE)

(72) Inventor: Holger Wild, Berlin (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 947 days.

(21) Appl. No.: 15/111,914

(22) PCT Filed: Dec. 15, 2014

(86) PCT No.: PCT/EP2014/077791
§ 371 (c)(1),
(2) Date: Sep. 20, 2016

(87) PCT Pub. No.: WO2015/110227
PCT Pub. Date: Jul. 30, 2015

(65) Prior Publication Data
US 2017/0024106 A1    Jan. 26, 2017

(30) Foreign Application Priority Data
Jan. 21, 2014 (DE) ............. 10 2014 200 993.6

(51) Int. Cl.
*G06F 3/0488* (2013.01)
*G06F 3/0482* (2013.01)
(Continued)

(52) U.S. Cl.
CPC ............ *G06F 3/0488* (2013.01); *B60K 35/00* (2013.01); *B60K 37/06* (2013.01); *G06F 3/0482* (2013.01);
(Continued)

(58) Field of Classification Search
CPC ... G06F 3/0488; G06F 3/0482; G06F 3/04847
See application file for complete search history.

(56) References Cited

U.S. PATENT DOCUMENTS

2007/0252822 A1   11/2007  Kim et al.
2010/0248788 A1    9/2010  Yook et al.
(Continued)

FOREIGN PATENT DOCUMENTS

| | | |
|---|---|---|
| CN | 103324435 A | 9/2013 |
| DE | 102007061993 A1 | 7/2008 |

(Continued)

OTHER PUBLICATIONS

International Search Report and Written Opinion for PCT/EP2014/077791 dated Jul. 30, 2015; 5 pages.

*Primary Examiner* — Andrea C Leggett
(74) *Attorney, Agent, or Firm* — Loza & Loza, LLP; Peter Zura

(57) ABSTRACT

System and method relating to a user interface for adapting a view of a display unit of a user interface. A configuration mode is retrieved for producing a separated view on the display unit including a first section and a second section. A functional scope may be assigned for at least one of the first section and the second section, and a plurality of operating surfaces may be generated in the separated view on the display unit, each of the operating surfaces representing a respective function for the vehicle. When a selection is received on one of the plurality of operating surfaces, the selected operating surface may be assigned to one of the first section and second section based on the selection, wherein the assigned operating surface is configured to execute its respective function for the vehicle under its assigned functional scope.

21 Claims, 3 Drawing Sheets

(51) Int. Cl.
     *B60K 35/00*     (2006.01)
     *B60K 37/06*     (2006.01)
     *G06F 3/0484*    (2013.01)

(52) U.S. Cl.
     CPC ...... *G06F 3/04847* (2013.01); *G06F 3/04886*
               (2013.01); *B60K 2370/11* (2019.05); *B60K*
                     *2370/122* (2019.05); *B60K 2370/1442*
                  (2019.05); *G06F 2203/04803* (2013.01)

(56)              References Cited

U.S. PATENT DOCUMENTS

2011/0107272  A1    5/2011   Aguilar
     2013/0145279  A1    6/2013   Ricci et al.
     2014/0351748  A1   11/2014   Xia et al.

FOREIGN PATENT DOCUMENTS

DE      102008054113  A1    5/2010
     DE      102009058145  A1    6/2011
     EP          2595042   A2    5/2013

USER INTERFACE AND METHOD FOR ADAPTING A VIEW OF A DISPLAY UNIT

RELATED APPLICATIONS

The present application claims priority under 35 U.S.C. § 371 to International PCT Application No. PCT/EP2014/07791 to Holger Wild, titled "User Interface and Method for Adapting a View of a Display Unit" filed Dec. 15, 2014, which claims priority to German Patent Application No. DE 10 2014 200 993.6 filed Jan. 21, 2014, each of which is incorporated by reference in its entirety herein.

TECHNICAL FIELD

The present invention relates to a user interface as well as a method for adapting a view on a display unit of a user interface. In particular, the present invention relates to improvements in ergonomics and a reduction of a number of operating steps required for generating separated views on a display unit.

BACKGROUND

The concept of separated views ("split screen") allows a user the parallel display and operation of two or more different contexts within one display unit (e.g., "matrix display", "touch display", "touch screen" or the like). Operating concepts without touch screen operation have the problem of a need to adjust the focus settings to the window to be operated/adapted. In particular, for the operation of display units of a user interface within a means of transport, it is necessary that the operating steps to be carried out and the control thereof do not prevent the user from performing his primary task, which is driving the means of transport.

US 2013/0145279 A1 relates to a portable user interface for a means of transport, in which icons of different functions seen in a sidebar can be dragged and dropped into a display operating area to display functions and buttons, which are associated with them, in enlarged form.

DE 10 2009 058 145 A1 discloses operating methods for a display device of a vehicle that propose, for example, separating a screen view by spreading two fingers while in contact with a touch-sensitive surface. In addition, the use of a proximity sensor system for switching between two different display variants is proposed. If the screen display was separated as prescribed, a selection menu for the selection of the application to be displayed in the subregion can be displayed in a respective sub region. So-called "drag and drop" gestures are only disclosed in connection with the launch of an application, using the example of assigning an audio output to a speaker.

The prior art, in the form of the aforementioned disclosures, does not exploit the possibilities for operating a user interface in the best possible way. It is therefore an object of the present invention to further improve the ergonomics in the operation of a user interface.

SUMMARY

According to illustrative embodiments, systems and methods are disclosed for adapting a view on a display unit of a user interface, as well as a user interface and a vehicle with such a user interface. The method of the invention serves for adapting a view on a display unit of a user interface. The display unit may include, for example, a touch-sensitive display instrument ("display") and may be supplemented by a proximity sensor system for detecting the presence of an input means in an area in front of the display unit. The display unit may be designed as a permanently installed display of a human-machine interface (HMI) inside a vehicle and/or a part of an instrument cluster. In an illustrative embodiment, a configuration mode for a separated view may be retrieved that includes a first section and a second section on the display unit. In other words, the user makes an entry, in response to which the separated view can be generated and/or modified. Here, the first section and the second section may be surface areas of the view, which can be independently assigned according to their content, for example, to functional areas of a means of transport. A plurality of operating surfaces may be displayed so as to represent a respective functional scope. The operating surfaces may serve in the configuration of the first section and the second section, and, by themselves, may not be configured to represent a way for launching a vehicle feature associated with them. The operating surfaces may be configured to display only in response to the retrieving of the configuration mode. In some illustrative embodiments, the user may select an operating surface from the plurality of operating surfaces to display a corresponding functional scope in the first section of the separated view (or in the second section of the separated view). Here, the user may optionally select both the function and the location where it is to be displayed in the future (e.g., first section or second section). Subsequently, the user may confirm the selected operating surface in conjunction with the first section, and thereby finally select a future spatial allocation of the desired functional scope to a surface area of the display. In this way, the present disclosure facilitates both an ergonomic configuration of the separated view and an ergonomic operation of the corresponding functional scopes after exiting the configuration mode.

In certain illustrative embodiments, systems and methods may further comprise selecting a predefined template for the relative arrangement of the first section and the second section to obtain the separated view. In other words, a plurality of screens can be shown by means of which the relative arrangement of the components of the separated view can be made available for selection. The user can select the template and/or screen before or after selecting the operating surfaces. For example, the user may select a plurality (e.g., three) operating surfaces, which the user would like to have displayed at the same time on the display unit. In response, the selected templates are displayed to the user, displaying three sections each in different spatial allocations in one example. Alternatively, the user may first select a spatial allocation of the contained sections from a plurality of different design templates (whereby the user also defines the number of sections) and then populate the sections of the view with functional scopes, as described above and elsewhere herein.

In some illustrative embodiments, the user may define a spatial arrangement of the sections in the separated view. The defining may be done freely, preferably by using certain constraints. In particular, optimal utilization of the screen area can be ensured automatically. Depending on the format of the display unit, the user can therefore define positions on the display unit in which respective sections are to be placed.

In some illustrative embodiments, the user may define borderlines between sections. This can be achieved, for example, by using a touch-sensitive surface of the display unit or by using a further detection unit. For example, a proximity sensor system (e.g., using an infrared LED strip) can detect the corresponding user gesture and implement it as a corresponding separated view. Preferably, the entries made by the user can be compared with a plurality of stored templates; the template that appears to be most similar to the entry will then be offered to the user for use. Here, a (arithmetic or geometric) distance between a user entry and a respective section of the variety of templates can be determined and assessed. The aforementioned options increase the flexibility in contrast to known configuration methods and can be used more intuitively than the known methods.

Preferably, the plurality of operating surfaces, from which a selection is made, is provided in the form of a movable sequence. In other words, a band of operating surfaces in a flush alignment is displayed, which can be moved, for example, by means of a gesture while in contact with the surface of the display unit. In this way, the operating surfaces can be shown in such sizes that not all of the operating surfaces of the sequence available for selection can be displayed simultaneously on the display unit. In this way, the optical orientation is improved by the user, whereby any operation, while driving a means of transport, translates into a reduced road safety risk.

The plurality of operating surfaces may be arranged along a demarcation line between the first and second sections, respectively, or may represent a demarcation line or a demarcation area, respectively. In this way, the user can quickly and intuitively view the operating surfaces available for selection, after dividing a display area into a first and a second section, and optionally populate the first section or the second section first with a desired functional scope. This can be done, for example, by selecting an operating surface by means of a touch of the display unit via an input means, which is then moved to the desired section. An assignment made in this way can be confirmed, for example, by terminating the contact between the input means (e.g., a user's finger, a stylus, or the like) and the surface of the display unit, after the motion, as described above, has been completed. The operating steps described above for defining the content items of a separated view have proven to be particularly intuitive and easy to perform.

In some illustrative embodiments, different scenarios are possible for exiting the configuration mode. For example, in the configuration mode, a period of time without user interaction with the display unit can be measured, and the configuration mode can be exited in response. Alternatively or in addition, it can be detected that the used input means has left a predefined area in front of the display unit. This can be done, for example, by using a so-called proximity sensor system. Another option is to exit the configuration mode automatically after the initial definition of a desired functional scope for each section that is to be populated is complete. Finally, operating a dedicated button or an operating element implemented in the hardware is also possible.

In some illustrative embodiments, configurations may be provided for intuitive operation for merging two sections of the separated view. A first operating surface may be selected and confirmed for a first section of the separated view. Subsequently, the same operating surface may be selected and confirmed for a second (e.g., adjacent) section of the separated view. Subsequently, the sections may be merged in such a way that a functional scope associated with the selected operating surface is displayed in a subregion of the view where, previously, the first section and the second section were displayed. If the first section and the second section were not adjacent relative to each other, a suitable template can be used automatically, or several possible suitable templates may be provided to the user to choose from. The latter option can be provided, for example, in the form of a so-called pop-up menu, or the like. In this way, the diversity of the displayed functional scopes can be reduced without having to repeat the proposed operating steps.

Retrieving of the configuration mode can be done in different ways. For example, a sensor strip or other hardware that is also suitable for the proximity sensor system can be actuated, for example, by touching the sensor strip at a desired position below the display unit for a predefined period of time with an input means. In particular, a horizontal position of the demarcation line can be intuitively and quickly defined in such a way. Alternatively or in addition, a specially predefined and displayed button on the display unit of the user interface can be actuated ("soft key"). Alternatively or in addition, a gesture within a predefined detection zone in front of the display unit can be carried out, wherein, in particular, the gesture comprises an open palm pointing to the display unit. The above-mentioned gesture, for example, can be detected by means of optical and/or capacitive sensors and can be interpreted as a user's wish to modify the display. Preferably, the above-mentioned gesture may also be associated with a minimum duration, so that the configuration mode is started only after expiry of this minimum duration while the gesture is being performed. The above-mentioned options for retrieving the configuration mode represent intuitive and certainly recognizable inputs of a user's desire. Further details on such configurations are described below.

In some illustrative embodiments, configurations are provided for adapting a view on a display unit of a user interface. Here, a predefined gesture with respect to the user interface is carried out for a predefined minimum duration. In the prior art, such gestures are also known as a "long press" gesture, if the gesture is carried out contacting the surface of the display unit and comprising substantially no motion of the used input means. In this case, the display unit comprises a touch-sensitive surface ("touch screen").

In illustrative embodiments, however, this gesture can also be carried out in an approach area of the user interface, whereby the input means is held still. In response to detecting the predefined gesture, a configuration mode for a separated view may be provided with a first section and a second section is displayed on the display unit. In some illustrative embodiments, the first section and the second section are arranged as a function of a position of the predefined gesture with respect to the user interface (in particular with respect to the display unit). In other words, a demarcation line between the first section and the second section is seen corresponding to the position of the gesture. The above-mentioned method facilitates a particularly intuitive option of separating a view into a first and a second section. In one example, a minimum duration of greater than 0.1 seconds to 0.8 seconds may be predefined for the gesture. The exact duration may have been predefined, for example, in a menu of the user interface for setting the triggering of secondary functions, or it may be predefined by a user, respectively. In this way, brief or inadvertent contacting the display unit or brief or accidental crossing out of an approach area will not be interpreted as a command for retrieving the configuration mode.

In some illustrative embodiments, a plurality of operating surfaces representing respective functional scopes may be displayed, from which the user may select the operating surface that is associated with the functional scope desired for the first section. To give effect to the selection, the user subsequently confirms the operating surface for the first section.

In some illustrative embodiments, the plurality of operating surfaces may be assigned to respective functional scopes from the fields of music playback, navigation, climate control, information playback of travel statistics ("on-board computer"), or the like. For this purpose, the operating surfaces can be marked with a symbol (e.g., "icon") and/or in writing. For example, representatively displayed may be a note for music playback, a compass for navigation, a thermometer for climate control and a gas station for the functions of the on-board computer. In this way it is possible to provide a compact yet clear display of the operating surfaces, while sections that are to be populated can be displayed simultaneously and substantially unchanged in their sizes.

In order for adapting the view to make it even more intuitive, and/or to alert the user as to their functions utilizing the display, optical highlighting may be configured for the plurality of operating surfaces, and provided for selection with respect to the separated view (sections to be populated). This can be generated, for example, by an increased color saturation of the operating surfaces, as compared to the rest of the screen content. In addition, the plurality of operating surfaces provided for selection may be displayed in a raised manner by a shadow cast on other screen content, suggesting a "throwing" of the operating surfaces to the sections of the separated view. Alternatively or in addition, the plurality of operating surfaces can be displayed in motion or in an animated manner, suggesting a mobility of the operating surfaces. For example, the operating surfaces may be configured to wiggle or "dance" about a center position. When the user selects an operating surface, and moves it over a section to be populated, the respective section can also be highlighted optically. This can be done, for example, by changing the color saturation, by displaying a frame ("corona") or by transparently displaying a functional scope that is optionally to be confirmed subsequently. In this way, the user is guided by easily comprehensible display scenarios utilizing any of the embodiments disclosed herein.

In some illustrative embodiments, a user interface may be provided that includes a display unit and a processing unit. The processing unit may include, for example, a programmable processor (e.g., a microcontroller, a nanocontroller, or the like), that may be used also for other functions outside the present disclosure. Furthermore, input means for receiving user input are provided in the user interface. The input means can be configured, for example, in the form of a touch-sensitive surface of the display unit. Alternatively or in addition, the input means may comprise infra-red LEDs, in the form of a strip, as proximity sensor system. The display unit, the processing unit and the input means may be operatively connected with each other via information technology means. By appropriately programming the processing unit, the user interface may be configured to perform the functions of the present disclosure alone, and/or in combinations. Preferably, the user interface can be configured and set up as man-machine interface, for example, for a means of transport, to be permanently installed in a dashboard of a means of transport and to be supplied through wiring with (sensor) information from the electrical system of the means of transport. In this way, for example, information from an on-board computer can be received and processed for display in a separated view.

In addition, a computer-readable medium is disclosed, having computer program code as well as a signal operation sequence, representing computer program code, are proposed, which, when executed on a processing unit of a user interface sets up the user interface for use in any of the embodiments disclosed herein. The computer-readable medium can be, for example, a CD, a DVD, another optical storage medium, a memory stick or any other volatile or non-volatile memory. The signal sequence protects the invention defined in the appended claims, regardless of the presence of a computer-readable medium. This also addresses signals entered into the scope of the present invention via a telecommunication infrastructure.

Finally, a means of transport (e.g., a passenger car, a truck, or the like) with a user interface according to the invention falls under the scope of protection. With respect to the means of transport according to the invention as regards the features, combination of features and the resultant benefits, reference is made to the present disclosure.

BRIEF DESCRIPTION OF THE DRAWINGS

Exemplary embodiments of the invention are described in detail below with reference to the accompanying drawings. In the drawings.

DETAILED DESCRIPTION

Figure 1:
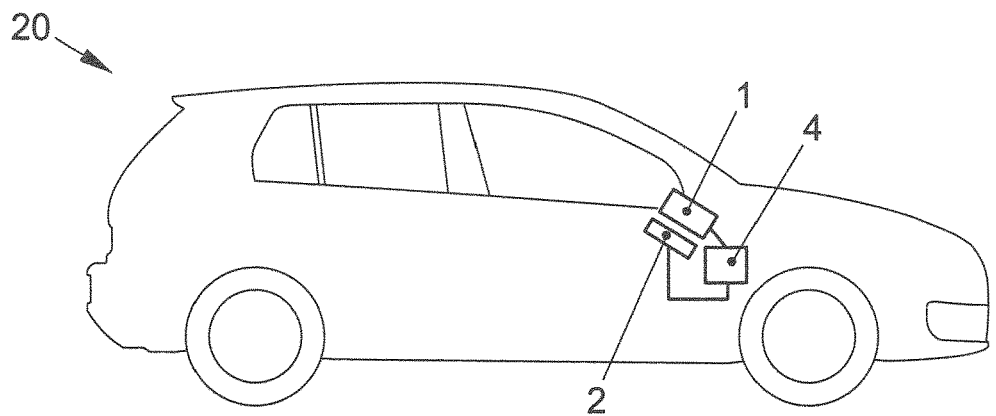
FIG. 1 is a schematic view of an exemplary embodiment of a means of transport according to an illustrative embodiment.

FIG. 1 shows a passenger car 20 as a means of transport under an illustrative embodiment. Arranged in the dashboard of car 20 are a display 1 as a display unit, an electronic controller 4 as processing unit, and an infrared LED strip 2 as input means are, and which are operatively connected to each other by information technology means. The display 1, the infrared LED strip 2 and the electronic controller 4 form a user interface according to the present disclosure under some illustrative embodiments, whose function will be explained in connection with FIGS. 2 to 7.

Figure 2:
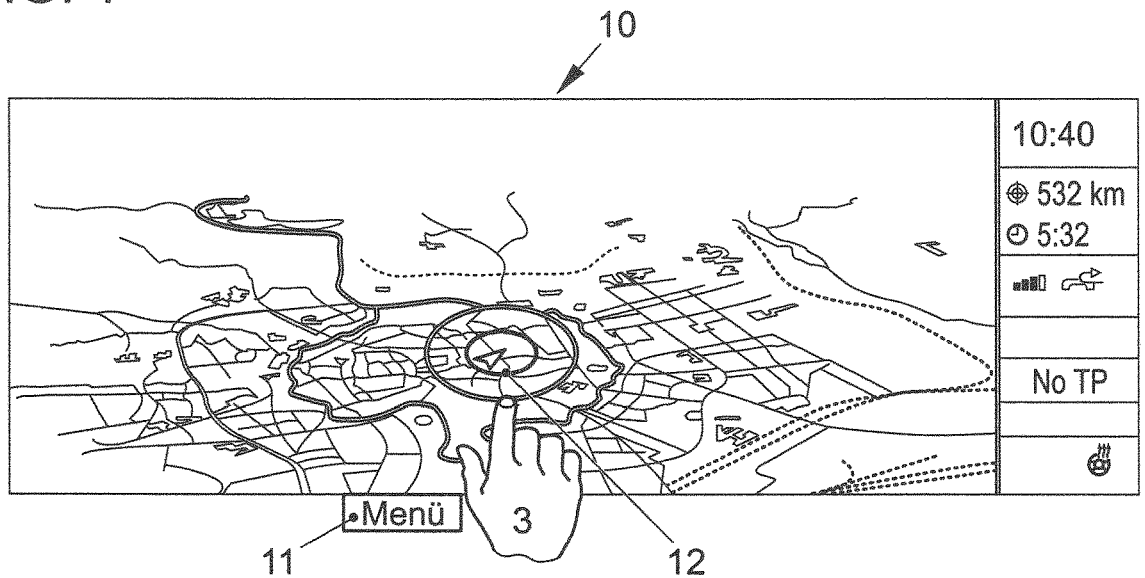
FIGS. 2 to 6 are representations of operating steps according to the invention in connection with exemplary embodiments of the method according to an illustrative embodiment.

FIG. 2 shows a view 10 of a display unit 1 displaying a section of a map under an illustrative embodiment. A predefined button 11 (labeled "Menu") is displayed below view 10. On the map, the hand 3 of a user performs a long press entry, as an example of a predefined gesture with a minimum duration as predefined by the controller, at a position 12, which has been predefined by the user.

Figure 3:
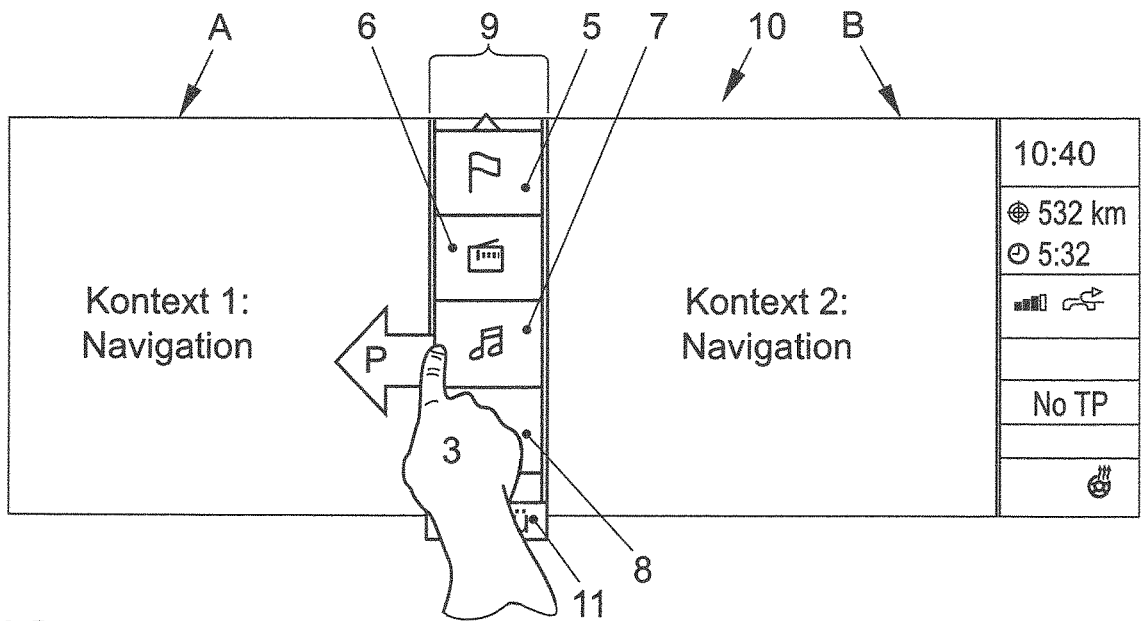

FIG. 3 shows a functional operation environment of the configuration of FIG. 2 under an illustrative embodiment. In response to the long press entry, a plurality of operating surfaces 5, 6, 7, 8 forms a demarcation area between a first section A and a second section B. In this example, the operating surfaces 5, 6, 7, 8 are lined up vertically above one another. A first operating surface 5 shows a flag icon as a symbol for information regarding a target position; a second operating surface 6 shows a radio icon as a symbol for the radio reception; and a third operating surface 7 shows a note as a symbol for music playback. Under hand 3 of the user, there are a fourth operating surface 8 and menu button 11, which can be seen in FIG. 2. The map, seen in focus as illustrated in FIG. 2, is seen as a blur in FIG. 3 in order to highlight optically the plurality of operating surfaces 5, 6, 7, 8 with respect to the separated view. To be able, nonetheless, to clearly see the functional scopes currently assigned to sections A, B the text callouts "Context 1: Navigation" or "Context 2: navigation" are displayed in the respective sections A, B. The hand of user 3 assigns the music playback function to the first section A by moving the third operating surface 7 to the left according to the arrow P.

Figure 4:
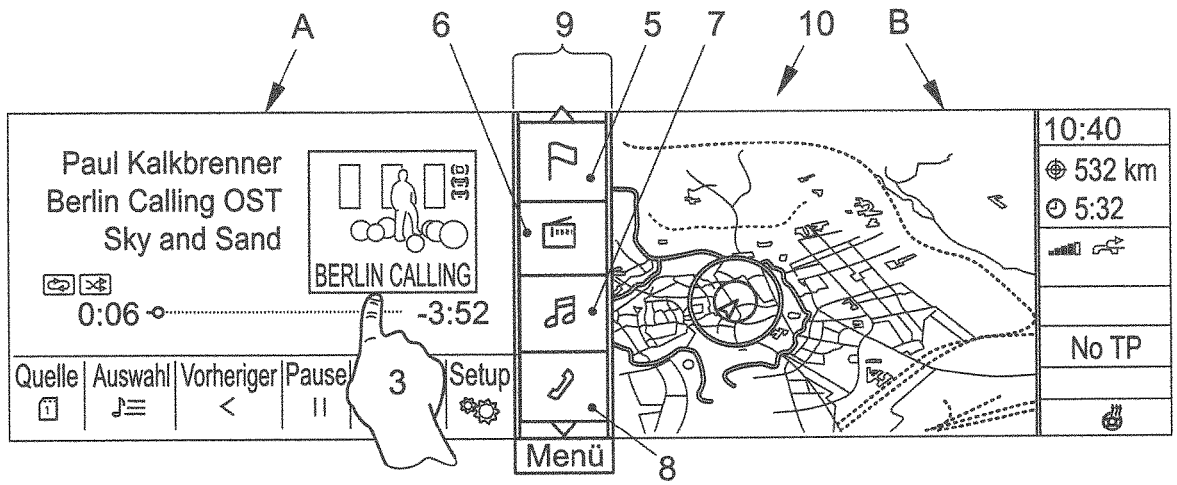

FIG. 4 shows a result of the functional operation environment described in connection with FIG. 3. In this example, the functional scope assigned to the sound settings is displayed in the first section A as it would be displayed after confirming the selection. To make the result of the selection stand out even more clearly, the map shown in the second section B is now displayed back in focus. In this example, the sequence of the operating surfaces 5, 6, 7, 8 continues to be displayed in demarcation area 9.

Figure 5:
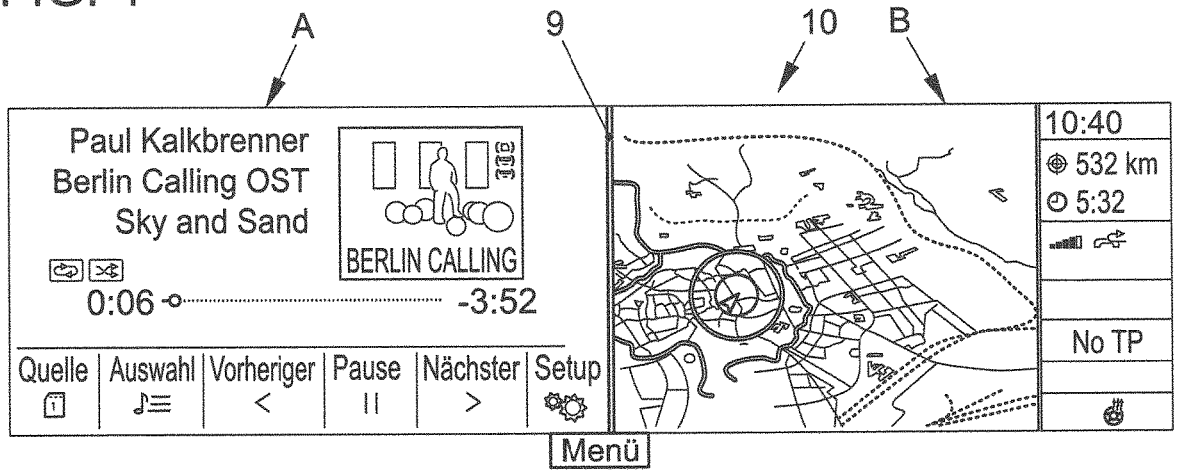

In the example of FIG. 5, the user has lifted his hand 3 from the surface of display unit 1 and has thus confirmed the selection made. The plurality of operating surfaces 5, 6, 7, 8 has been removed and demarcation area 9 shown in FIG. 3 is shown tapered to a narrow demarcation line 9. Now, the first section A displays a functional scope assigned to music playback; the second section B displays a functional scope assigned to navigation.

Figure 6:
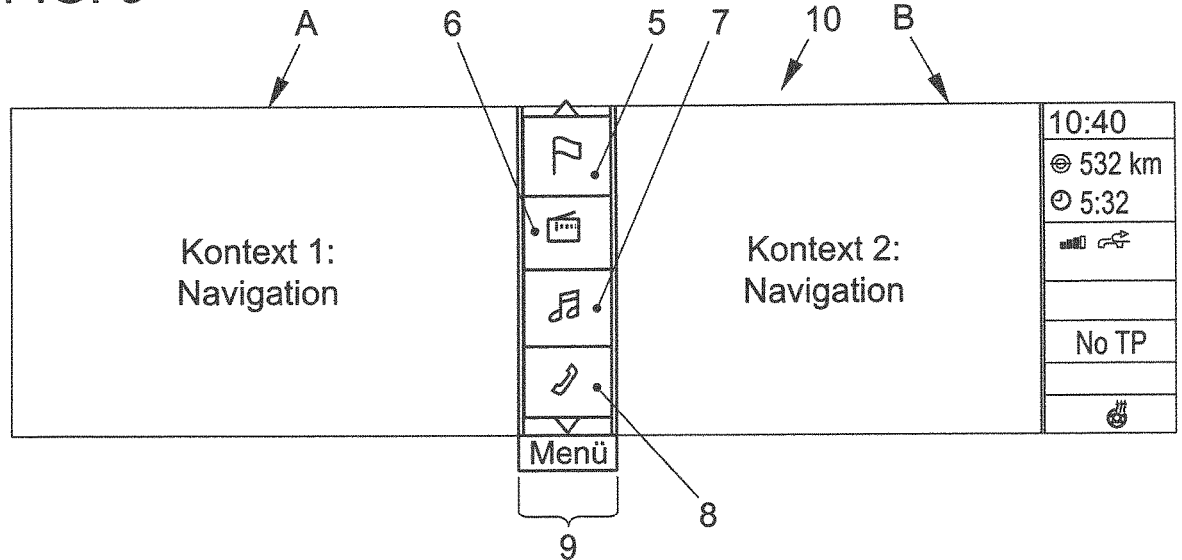

FIG. 6 shows a display after retrieving the configuration mode illustrated in FIG. 3 under an illustrative embodiment. For example, again, the user has faded in the plurality of operating surfaces by another long press gesture. It is noted that the functional scope within the first section A (blurred) displays a part of the map, which had been replaced in the previously described operating environment by the sound settings 7. This allows for rapid and simple change-back of any adaptations made previously. In one example, if the configuration mode is reopened, and no user input is registered before the expiry of a predefined time period ("inactivity timer"), it will automatically be returned to a penultimate view 10. Of course, however, the user may, starting from the situation shown in FIG. 6, again move operating surfaces 5, 6, 7, 8 from the demarcation area 9 to the respective sections A, B and, in such a way, create a new desired view.

Figure 7:
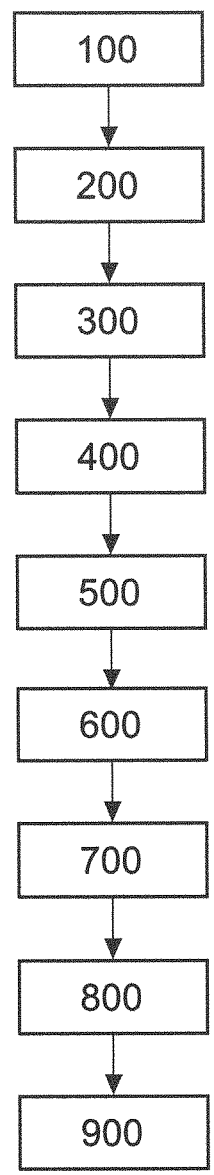
FIG. 7 is a flow diagram illustrating steps of an exemplary embodiment of a method according to an illustrative embodiment.

FIG. 7 shows a flow chart illustrating steps of a method for displaying and processing operating surface interactions with a user under an illustrative embodiment. In step 100, a user retrieves a configuration mode for a separated view with at least one first section and one second section on a display unit of a user interface. In step 200, the user may then define a spatial arrangement in the separated view of sections contained therein. In other words, the user may first arrange those areas which he then assigns functional scopes. To this end, in step 300, a plurality of operating surfaces, representing a respective functional scope, is displayed. The user may select an operating surface from the plurality to assign a corresponding functional scope to a first section. In step 500, the user may confirm the selected operating surface, in response to which the functional scope is displayed in the first section. To merge the first section and a second section, for example, to reduce the number of sections by 1, the user may select, in step 600, the same operating surface also for a second section of the separated view. Subsequently, the user also confirms, in step 700, for the second section of the separated view the operating surface already assigned to the first section. In an illustrative embodiment, a different functional scope may be displayed in both the first section and the second section in response, but in a merged section, in enlarged form. Instead of having to completely reconfigure the separated view, the user can easily and intuitively reduce, in this way, the variety of the functional scopes displayed. Of course, by appropriately repeating the above-mentioned operating steps (depending on the previously displayed section shares) this can be continued, ranging all the way to the full-screen display of a single desired functional scope.

Although the aspects of the invention and advantageous embodiments have been described in detail by way of the exemplary embodiments with reference to the accompanying figures in the drawings, modifications and combinations of features of the illustrated embodiments are apparent to persons skilled in the art without departing from the field of the present invention, the scope of which is defined by the appended claims.

LIST OF REFERENCE NUMERALS

1 Display
2 Infrared LED strip
3 The user's hand
4 Electronic controller
5, 6, 7, 8 Operating surfaces
9 Demarcation line, demarcation area
10 View
11 Button
12 Input position
20 Passenger car
100 to 900 Steps of the method
A First section
B Second section
P Arrow

The invention claimed is:

1. A method for configuring a display unit of a user interface for a vehicle, comprising:
retrieving, via a processor, a configuration mode for producing a separated view on the display unit comprising a first section and a second section;
assigning a functional scope for at least one of the first section and the second section;
generating a plurality of operating surfaces in the separated view on the display unit between the first section and the second section, each of the operating surfaces representing a respective function for the vehicle; and
receiving a selection on one of the plurality of operating surfaces and assigning the selected operating surface to one of the first section and second section based on the selection, wherein the selection comprises a movement of a selected operating surface to one of the first section and second section, and wherein the assigned operating surface is configured to execute its respective function for the vehicle under its assigned functional scope.

2. The method of claim 1, further comprising at least one of:
selecting, via the processor, a predefined template for the relative arrangement of the first section and the second section for the separated view; and/or
defining a spatial arrangement of the first section and the second section contained in the separated view.

3. The method of claim 1, wherein the plurality of operating surfaces are displayed for selection in the form of a movable sequence.

4. The method of claim 1, further comprising arranging the plurality of operating surfaces along a demarcation line between the first section and the second section.

5. The method of claim 1, further comprising:
receiving another selection on the previously-selected operating surface and assigning the another-selected operating surface to another one of the first section and second section based on the another selection; and automatically merging the first section and the second section.

6. The method of claim 1, wherein the retrieving of the configuration mode comprises one of
actuating a sensor strip,
actuating a predefined button on the display unit of the user interface, or
detecting a user gesture in a predefined detection zone in front of the display unit.

7. The method of claim 1, further comprising:
detecting a predefined gesture before the user interface for a predefined minimum duration, and, in response, displaying the configuration mode for the separated view comprising the first section and the second section,
wherein the first section and the second section are configured to be displayed on the display unit relative to each other as a function of a position of the predefined gesture.

8. The method of claim 7, further comprising:
generating a demarcation line between the first section and the second section based on a position of the predefined gesture.

9. The method of claim 7, wherein the detected gesture comprises a predefined minimum duration of contact with at least one of the user interface and/or the display unit, and wherein the detected gesture comprises a predefined maximum movement relative to the user interface.

10. The method according to claim 1, wherein the respective function for the vehicle comprises at least one of music playback, navigation, climate control, and/or information playback of travel statistics.

11. The method according to claim 1, further comprising
highlighting at least one of the plurality of operating surfaces, wherein the highlighting comprises one of
increasing color saturation of the at least one highlighted operating surface in contrast to other screen content items,
displaying a shadow cast of the at least one highlighted operating surface, and
animating the at least one highlighted operating surface.

12. A vehicle user interface, comprising:
a display unit;
a processing unit, and
an input for receiving user input, wherein the processing unit is configured to
retrieve a configuration mode for producing a separated view on the display unit comprising a first section and a second section;
assign a functional scope for at least one of the first section and the second section;
generate a plurality of operating surfaces in the separated view between the first section and the second section on the display unit, each of the operating surfaces representing a respective function for the vehicle;
and wherein the input is configured to receive a selection on one of the plurality of operating surfaces and the processing unit is configured to assign the selected operating surface to one of the first section and second section based on the selection wherein the selection comprises a movement of a selected operating surface to one of the first section and second section, and wherein the assigned operating surface is configured to execute its respective function for the vehicle under its assigned functional scope.

13. The vehicle user interface of claim 12, wherein the processing unit is configured to either (1) select a predefined template for the relative arrangement of the first section and the second section for the separated view, or (2) define a spatial arrangement of the first section and the second section contained in the separated view.

14. The vehicle user interface of claim 12, wherein the processing unit is configured to display a plurality of operating surfaces for selection on the display unit in the form of a movable sequence.

15. The vehicle user interface of claim 12, wherein the processing unit is configured to arrange the plurality of operating surfaces on the display unit along a demarcation line between the first section and the second section.

16. The vehicle user interface of claim 12, wherein
the input is configured to receive another selection on the previously-selected operating surface and the processing unit is configured to assign the another-selected operating surface to another one of the first section and second section based on the another selection,
and wherein the processing unit is configured to automatically merge the first section and the second section on the display unit.

17. The vehicle user interface of claim 12, wherein the configuration mode comprises one of
actuating a sensor strip,
actuating a predefined button on the display unit of the user interface, or
detecting a user gesture in a predefined detection zone in front of the display unit.

18. The vehicle user interface of claim 12, wherein
the processing unit is configured to detect a predefined gesture before the user interface for a predefined minimum duration, and, in response, display the configuration mode on the display unit for the separated view comprising the first section and the second section,
and wherein the processing unit is configured to display the first section and the second on the display unit relative to each other as a function of a position of the predefined gesture.

19. The vehicle user interface of claim 18, wherein the processing unit is configured to generate a demarcation line between the first section and the second section on the display unit based on a position of the predefined gesture.

20. The vehicle user interface of claim 18, wherein the detected gesture comprises a predefined minimum duration of contact with at least one of the user interface and/or the display unit, and wherein the detected gesture comprises a predefined maximum movement relative to the user interface.

21. The vehicle user interface according to claim 12, wherein the respective function for the vehicle comprises at least one of music playback, navigation, climate control, and/or information playback of travel statistics.

* * * * *